(12) United States Patent
Vijayan et al.

(10) Patent No.: US 11,811,232 B2
(45) Date of Patent: Nov. 7, 2023

(54) BATTERY STATE OF CHARGE COMPENSATION

(71) Applicant: General Electric Company, Schenectady, NY (US)

(72) Inventors: Pradeep Vijayan, Bangalore (IN); Ruxi Wange, Cary, NC (US)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 17/504,612

(22) Filed: Oct. 19, 2021

(65) Prior Publication Data

US 2022/0302704 A1    Sep. 22, 2022

(30) Foreign Application Priority Data

Mar. 18, 2021    (IN) ............................. 202111011536

(51) Int. Cl.
*H02J 3/32* (2006.01)
*H02J 1/10* (2006.01)
*H02M 3/158* (2006.01)

(52) U.S. Cl.
CPC ............... *H02J 3/32* (2013.01); *H02J 1/106* (2020.01); *H02M 3/1584* (2013.01); *H02J 2310/44* (2020.01)

(58) Field of Classification Search
CPC .......... H02J 3/32; H02J 1/106; H02J 2310/44; H02M 3/1584
See application file for complete search history.

(56) References Cited

U.S. PATENT DOCUMENTS

| 4,635,178 | A | 1/1987 | Greenhalgh |
| 9,590,505 | B2 | 3/2017 | Moon et al. |
| 9,751,614 | B1* | 9/2017 | Nguyen ................. B64C 15/02 |
| 10,038,334 | B2 | 7/2018 | Banno |
| 10,389,128 | B2 | 8/2019 | Rancuret et al. |

(Continued)

FOREIGN PATENT DOCUMENTS

| CN | 105656021 A | 6/2016 |
| CN | 106300324 A | 1/2017 |

(Continued)

OTHER PUBLICATIONS

Khan Duc Hoang, Hong-Hee Lee; "State of Charge Balancing of Distributed Batteries with Different Capacities in DC Microgrid"; May 2020; IEEE. pp. 3703-3707. (Year: 2020).*

(Continued)

*Primary Examiner* — Harry R Behm
(74) *Attorney, Agent, or Firm* — Dority & Manning, P.A.

(57) ABSTRACT

An electric power source includes: a battery defining a state of charge; a converter in electrical communication with the battery; and a controller in operable communication with the converter, the controller including a compensation toggle circuit configured to provide a compensation toggle value based on a power output of the battery; a dynamic droop control circuit configured to receive the compensation toggle value and switch an output droop value of the dynamic droop control circuit from an upper output droop measurement to a lower output droop measurement, wherein the lower output droop measurement is based on the state of charge of the battery.

20 Claims, 9 Drawing Sheets

(56) References Cited

U.S. PATENT DOCUMENTS

| | | |
|---|---|---|
| 10,483,758 B2 | 11/2019 | Liang et al. |
| 10,498,239 B2 | 12/2019 | Jiang et al. |
| 2018/0366948 A1 | 12/2018 | Lehn et al. |
| 2020/0169083 A1 | 5/2020 | Zubieta |
| 2020/0321880 A1* | 10/2020 | Lee .................. H02M 3/335 |

FOREIGN PATENT DOCUMENTS

| | | |
|---|---|---|
| CN | 108599233 A | 9/2018 |
| CN | 111987713 A | 11/2020 |
| CN | 112104024 A | 12/2020 |

OTHER PUBLICATIONS

Chen Wang; "State of Charge Dynamic Balancing Control for Multi-Energy Storage Units in DC Distribution System"; IEEE; May 2019; pp. 2116-2120. (Year: 2019).*

* cited by examiner

BATTERY STATE OF CHARGE COMPENSATION

PRIORITY INFORMATION

The present application claims priority to Indian Patent Application Number 202111011536 filed on Mar. 18, 2021.

FIELD

The present subject matter relates generally to a state of charge compensator for batteries of a power system, such as a battery system of a hybrid-electric aeronautical propulsion system.

BACKGROUND

Certain aircraft utilize electric power to drive or supplement propulsive devices of an aircraft, various aircraft loads, or both. It is not uncommon for the aircraft to include a plurality of batteries to provide such power, or to supplement such power. During operation, it is not uncommon for the states of charge of the various batteries to vary due to, e.g., uneven charging, age of the battery, use of the battery, etc.

Batteries with uneven states of charge may result in loss of system performance. A system and/or method for reducing the unevenness in the charge state between batteries would be useful.

BRIEF DESCRIPTION

Aspects and advantages of the invention will be set forth in part in the following description, or may be obvious from the description, or may be learned through practice of the invention.

In one exemplary embodiment of the present disclosure, an electric power source is provided. The electric power source includes: a battery defining a state of charge; a converter in electrical communication with the battery; and a controller in operable communication with the converter, the controller including a compensation toggle circuit configured to provide a compensation toggle value based on a power output of the battery; a dynamic droop control circuit configured to receive the compensation toggle value and switch an output droop value of the dynamic droop control circuit from an upper output droop measurement to a lower output droop measurement, wherein the lower output droop measurement is based on the state of charge of the battery.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
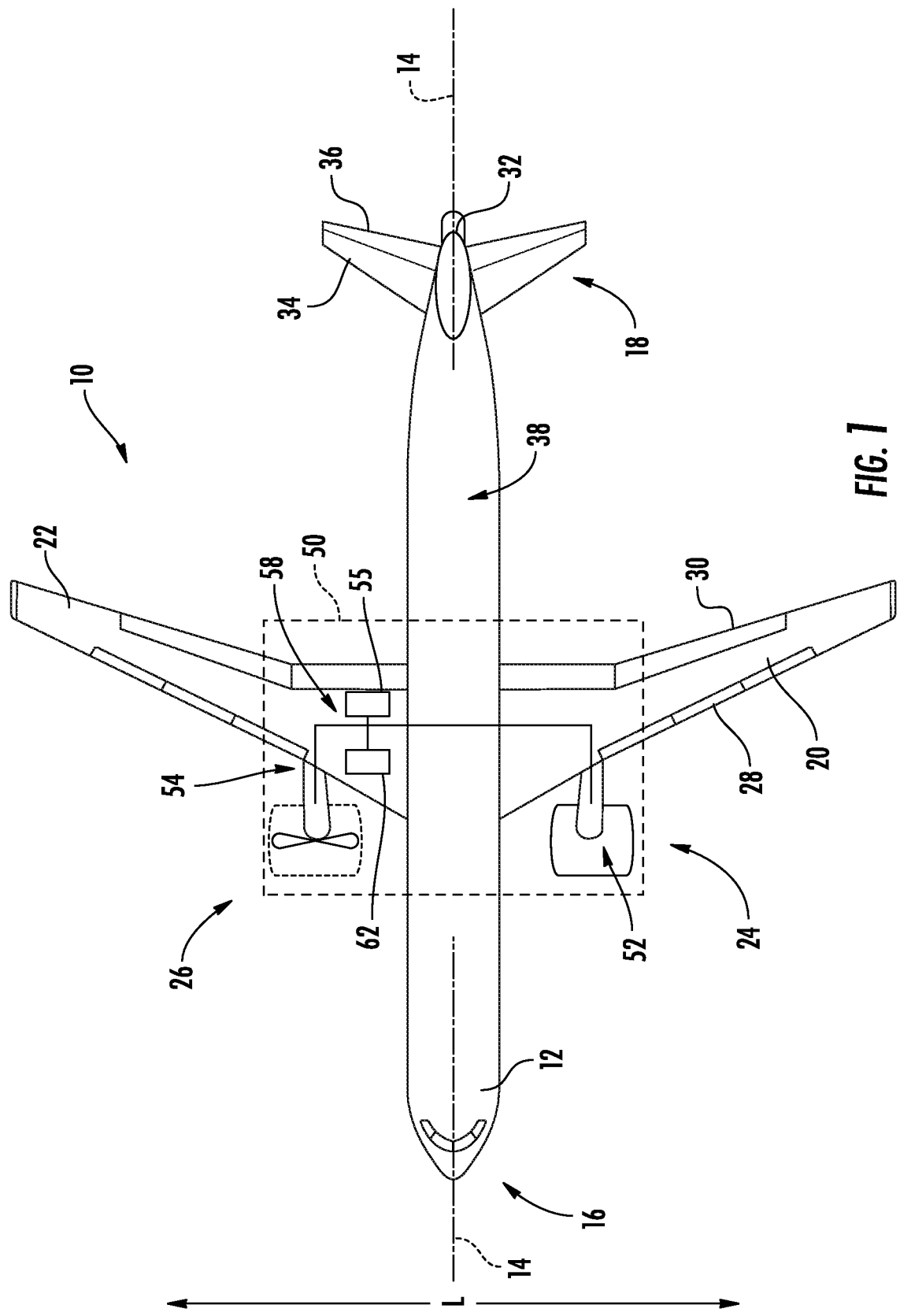
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", "third", etc. may be used interchangeably to distinguish one component from another and are not intended to signify location or importance of the individual components.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller", are not limited to just those integrated circuits referred to in the art as a computer, but further broadly refers to one or more processing devices including one or more of a microcontroller, a microcomputer, a programmable logic controller (PLC), an application specific integrated circuit, and other programmable circuits, and these terms are used interchangeably herein. In the embodiments described herein, the computer or controller may additionally include memory. The memory may include, but is not limited to, a computer-readable medium, such as a random access memory (RAM), a computer-readable non-volatile medium, such as a flash memory.

Alternatively, a floppy disk, a compact disc-read only memory (CD-ROM), a magneto-optical disk (MOD), and/or a digital versatile disc (DVD) may also be used. Also, in the embodiments described herein, the computer or controller may include one or more input channels and/or one or more output channels. The input channels may be, but are not limited to, computer peripherals associated with an operator interface such as a mouse and a keyboard, or sensors, such as engine sensors associated with an engine, such as a gas turbine engine, for determining operating parameters of the engine. Furthermore, in the exemplary embodiment, the output channels may include, but are not be limited to, an operator interface monitor. Further, the memory may store software or other instructions, which when executed by the controller or processor allow the controller to perform certain operations or functions. The term "software" may include any computer program stored in memory, or accessible by the memory, for execution by, e.g., the controller, processor, clients, and servers.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and a wing assembly including a port side and a starboard side. More specifically, the port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
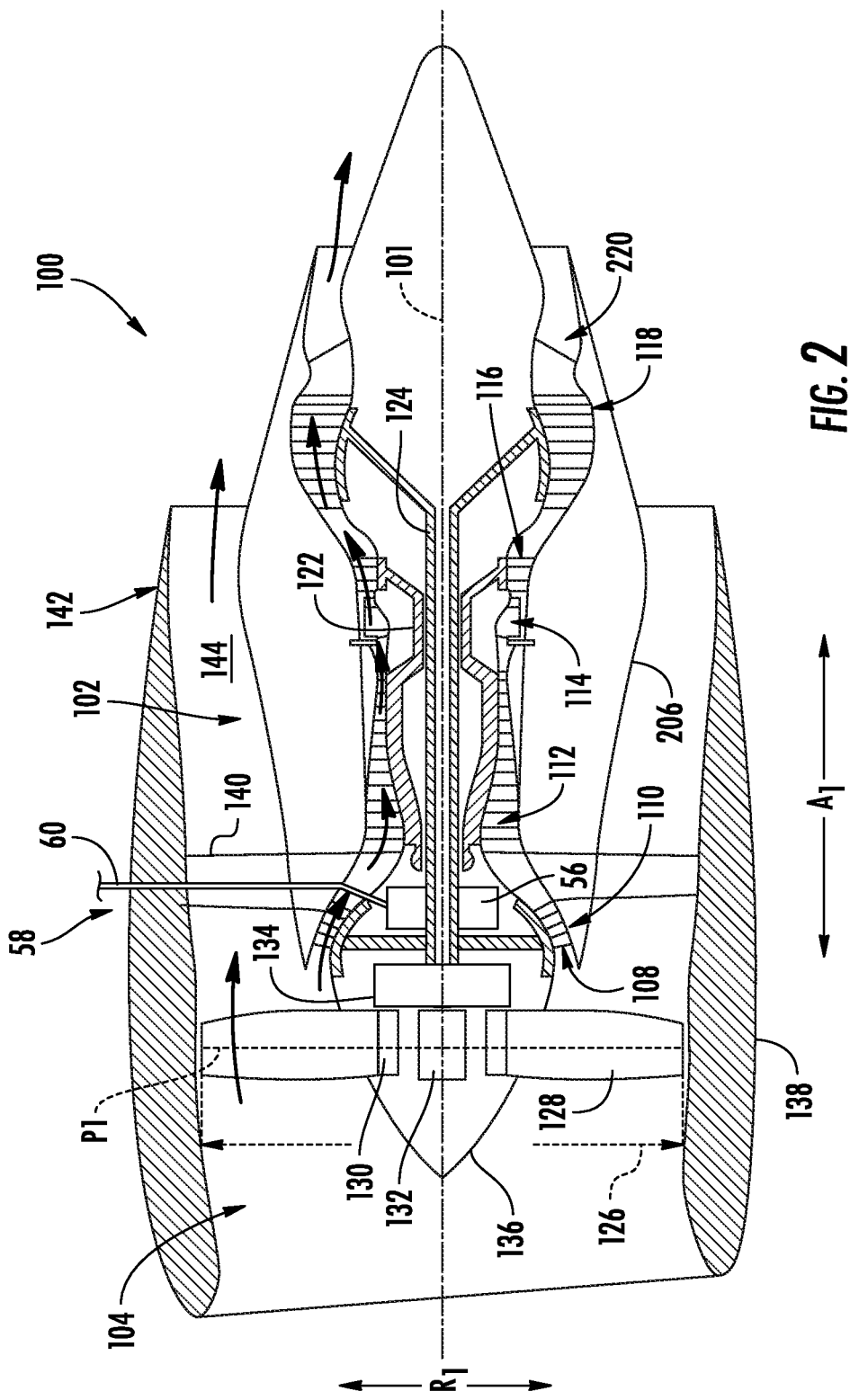
FIG. 2 is a schematic, cross-sectional view of a gas turbine engine in accordance with an exemplary embodiment of the present disclosure, which may be mounted to the exemplary aircraft of FIG. 1.
Figure 3:
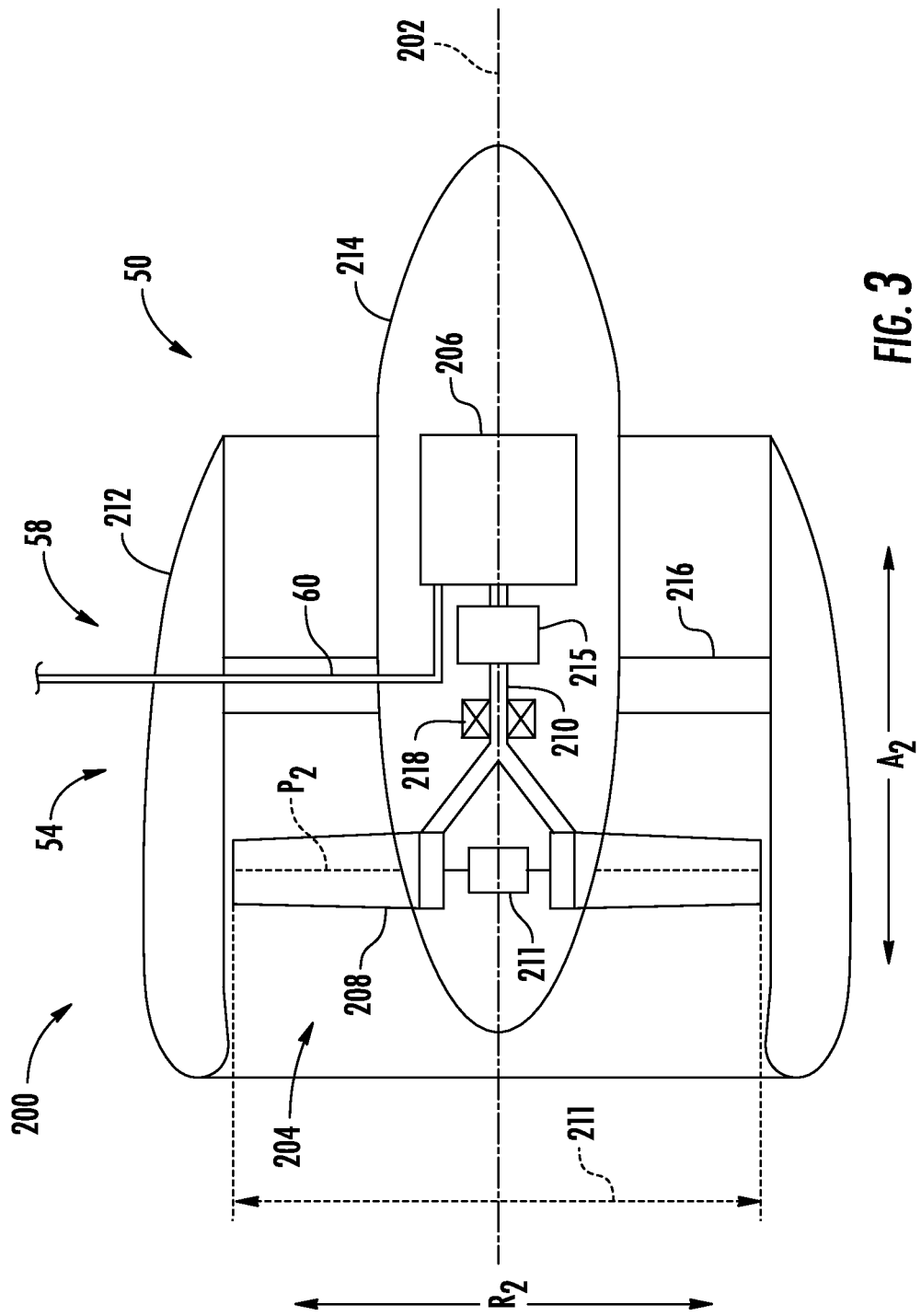
FIG. 3 is a schematic, cross-sectional view of an electric fan assembly in accordance with an exemplary embodiment of the present disclosure, which may be mounted to the exemplary aircraft of FIG. 1.

Referring now also to FIGS. 2 and 3, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. As is depicted, each of the first propulsor assembly 52 and second propulsor assembly 54 are configured as under-wing mounted propulsor assemblies.

Referring particularly to FIGS. 1 and 2, the first propulsor assembly 52 is mounted, or configured to be mounted, to the first side 24 of the aircraft 10, or more particularly, to the first wing 20 of the aircraft 10. The first propulsor assembly 52 generally includes a turbomachine 102 and a primary fan (referred to simply as "fan 104" with reference to FIG. 2). More specifically, for the embodiment depicted the first propulsor assembly 52 is configured as a turbofan engine 100 (i.e., the turbomachine 102 and the fan 104 are configured as part of the turbofan 100).

As shown in FIG. 2, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, low pressure (LP) turbine 118 and a second, high pressure (HP) turbine 116; and a jet exhaust nozzle section 120.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. As will be appreciated, the fan 104 includes a total number (i.e., count) of fan blades 128 and defines a fan diameter 126. The fan diameter 126 refers to a measurement twice as long as a radius of a fan blade 128, the radius of a fan blade 128 being a measurement from a tip of a fan blade 128 to the longitudinal centerline axis 101 along the radial direction R1.

The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the first, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the propulsion system 50 additionally includes an electric machine, which for the embodiment depicted is configured as an electric generator 56. The electric generator 56 is, for the embodiment depicted, positioned within the turbomachine 102 of the turbofan engine 100 and is in mechanical communication with one of the shafts of the turbofan engine 100. More specifically, for the embodiment depicted, the electric generator is driven by the first, LP turbine 118 through the LP shaft 124. The electric generator 56 is configured to convert mechanical power of the LP shaft 124 to electric power. Accordingly, the electric generator 56 is also powered by the LP system (including the LP turbine 118) of the turbomachine 102.

It should be appreciated, however, that in other exemplary embodiments, the electric generator 56 may instead be positioned at any other suitable location within the turbomachine 102 or elsewhere, and may be, e.g., powered in any other suitable manner. For example, the electric generator 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric generator 56 may instead be powered by the HP system, i.e., by the HP turbine 116 through the HP shaft 122, or by both the LP system (e.g., the LP shaft 124) and the HP system (e.g., the HP shaft 122) via a dual drive system.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated, that in other exemplary embodiments, the turbofan engine 100 may instead be configured as any other suitable aircraft engine including a turbomachine mechanically coupled to a primary fan. For example, in other embodiments, the turbofan engine 100 may instead be configured as a turboprop engine (i.e., the primary fan may be configured as a propeller), an unducted turbofan engine (i.e., the gas turbine engine may not include the outer nacelle 138), etc.

Referring still to FIGS. 1 and 2, the propulsion system 50 depicted additionally includes an electrical power bus 58 to allow the electric generator 56 to be in electrical communication with one or more other components of the propulsion system 50 and/or the aircraft 10. For the embodiment depicted, the electrical power bus 58 includes one or more electrical lines 60 connected to the electric generator 56, and for the embodiment depicted, extending through one or more of the outlet guide vanes 140. Additionally, the propulsion system 50 depicted further includes one or more energy storage devices 55 (such as one or more batteries or other electrical energy storage devices) electrically connected to the electrical power bus 58 for, e.g., providing electrical power to the electric fan assembly 54 and/or receiving electrical power from the electric generator 56. In certain exemplary embodiments, the one or more energy storage devices 55 may be positioned proximate the electric fan assembly 54 for weight distribution purposes. Inclusion of the one or more energy storage devices 55 may provide performance gains, and may increase a propulsion capability of the propulsion system 50 during, e.g., transient operations. More specifically, the propulsion system 50 including one or more energy storage devices 55 may be capable of responding more rapidly to speed change demands.

Referring now particularly to FIGS. 1 and 3, the exemplary propulsion system 50 additionally includes the second propulsor assembly 54 positioned, or configured to be positioned, at a location spaced apart from the first propulsor assembly 52 (including, e.g., the turbomachine and the primary fan). More specifically, for the embodiment depicted, the second propulsor assembly 54 is mounted at a location away from the first propulsor assembly 52 along the lateral direction L such that they ingest different airstreams along the lateral direction L. However, in other embodiments, the first and second propulsor assemblies 52, 54 may each be mounted to the aircraft 10 using a common mount. With such a configuration, however, the first and second propulsor assemblies 52, 54 may still be positioned on the mount in a manner such that they are spaced apart from one another, e.g., along the lateral direction L such that they ingest different airstreams along the lateral direction L.

Referring still to the exemplary embodiment of FIGS. 1 and 3, the second propulsor assembly 54 is mounted to the second side 26 of the aircraft 10, or rather to the second wing 22 of the aircraft 10. Referring particularly to FIG. 3, the second propulsor assembly 54 is generally configured as an electric fan assembly including an electric fan 200. The electric fan 200 defines an axial direction A2 extending along a longitudinal centerline axis 202 that extends therethrough for reference, as well as a radial direction R2. Additionally, the electric fan 200 generally includes a fan 204 and an electric machine, which for the embodiment depicted is configured as an electric motor 206. For the embodiment depicted, the fan 204 is rotatable about the centerline axis 202.

The fan 204 includes a plurality of fan blades 208 and a fan shaft 210. The plurality of fan blades 208 are attached to/rotatable with the fan shaft 210 and spaced generally along a circumferential direction of the electric fan 200 (not shown). More specifically, the fan 204 of the electric fan 200 generally includes a total number of fan blades 208 and defines a fan diameter 211. The fan diameter 211 refers to a measurement twice as long as a radius of a fan blade 208, the radius of a fan blade 208 being a measurement from a tip of a fan blade 208 to the longitudinal centerline axis 22 along the radial direction R2.

In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric fan 200 depicted additionally includes a fan casing or outer nacelle 212, attached to a core 214 of the electric fan 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric fan 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. For the embodiment depicted, the electric motor 206 is configured as a variable speed electric motor, such that the electric motor 206 may drive the fan 204 at various rotational speeds despite an amount of power provided thereto. Additionally, for the embodiment depicted, the electric fan 200 additionally includes a gearbox 215 allowing for the rotational speed of the fan shaft 210 to be further increased or decreased relative to a rotational speed of the electric motor 206. Accordingly, for the embodiment depicted, the electric motor 206 further drives the fan 204 across the gearbox 215 and through the fan shaft 210.

The fan shaft 210 is supported by one or more bearings 218, such as the one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor). As briefly noted above, the electric generator 56 of the propulsion system 50 is in electrical communication with the electric fan 200 for powering the electric fan 200. More particularly, the electric motor 206 of the electric fan 200 is in electrical communication with the electrical power bus 58, which for the embodiment depicted includes one or more electrical lines 60 electrically connected to the electric motor 206. Accordingly, the electric motor 206 is more particularly in electrical communication with the electrical power bus 58 through one or more electrical lines 60 of the electrical power bus 58, and the electrical power bus 58 may deliver power to the electric motor 206 for driving the electric motor 206, and in turn driving the fan 204.

Referring again briefly to FIG. 1, the propulsion system 50 depicted, or rather, the electric power bus 58 depicted, additionally includes an electric controller 62. The exemplary electric generator 56 depicted is in electrical communication with the electric fan 200 through the electric controller 62 of the electric power bus 58. The electric controller 62 may be operably connected to one or more additional controllers of the aircraft, for controlling an amount of power provided to the electric fan assembly.

Additionally, it should be appreciated that in certain exemplary embodiments, the fan 204 of the electric fan 200 may be different than the fan 104 of the turbofan engine 100. More specifically, at least one of the fan diameter 126 or the total number of fan blades 128 of the fan 104 of the turbofan engine 100 may be different than the fan diameter 211 or total number of fan blades 208 of the fan 204 of the electric fan 200 of the electric fan assembly. Additionally, or alternatively, in other exemplary embodiments, the fan 104 of the turbofan engine may define a fan pressure ratio distinct from a fan pressure ratio of the fan 204 the electric fan 200 during operation of the respective fans at a rated speed. As used herein, the term "fan pressure ratio" refers to a ratio of an air pressure immediately downstream of a fan to an air pressure immediately upstream of the respective fan. Additionally, used herein, the term "rated speed", with reference to the electric fan 200 and turbofan engine 100, refers to a maximum rotational speed that the electric fan 200 and turbofan engine 100 may achieve while operating properly. For example, the electric fan 200 and turbofan engine 100 may be operating at their respective rated speed during maximum load operations, such as during takeoff operations.

A propulsion system in accordance with one or more of the above embodiments may be referred to as a gas-electric, or hybrid propulsion system, given that a first propulsor assembly is configured as a turbofan engine mounted to a first side of an aircraft and a second propulsor assembly is configured as an electrically driven fan mounted to a second side of the aircraft. Such a configuration may allow for a single, relatively large engine to power two or more propulsors (which may be configured as, e.g., fans, propellers, etc.). Accordingly, a propulsion system in accordance with one or more embodiments of the present disclosure may allow for inclusion of a relatively large engine, which may in turn allow for an engine having increased efficiencies (as compared to relatively small engines).

It should be appreciated, however, that in other embodiments, the electric fan assembly may include an electric fan 200 having any other suitable configuration. For example, in other embodiments, the electric fan 200 may be configured without an outer nacelle 212 (i.e., configured as an un-ducted electric fan). Accordingly, it should be appreciated that in certain exemplary embodiments, the electric fan assembly may include an un-ducted electric fan.

Additionally, in still other embodiments, the exemplary propulsion system may be integrated into an aircraft 10 in any other suitable manner. For example, referring now to FIG. 4, an aircraft 10 and propulsion system 50 in accordance with another exemplary embodiment of the present disclosure is depicted. The exemplary aircraft 10 and propulsion system 50 of FIG. 4 may be configured in substantially the same manner as exemplary aircraft 10 and propulsion system 50 of FIGS. 1 through 3, and accordingly, the same or similar numbers may refer to same or similar parts.

Figure 4:
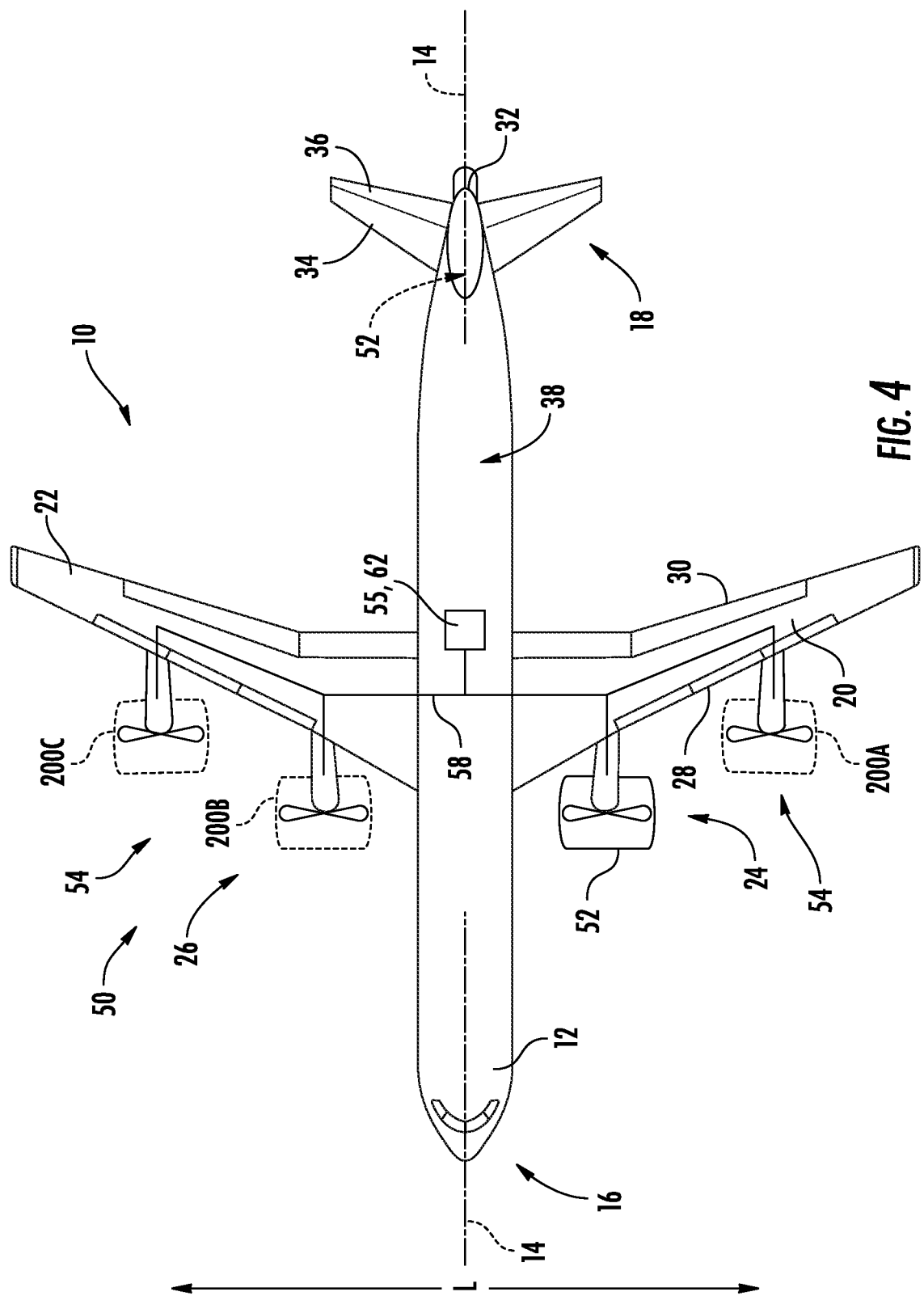
FIG. 4 is a top view of an aircraft including a propulsion system according to another exemplary embodiment of the present disclosure.

For example, the exemplary aircraft 10 of FIG. 4 generally includes a fuselage 12 and a wing assembly, the wing assembly including a port side wing 20 and a starboard side wing 22. Additionally, the propulsion system 50 includes a first propulsion system 52 including a turbomachine and a fan, the turbomachine and fan configured, e.g., as part of a turbofan engine. The propulsion system 50 additionally includes an electric generator 56 mechanically driven by the turbomachine (see FIG. 2). Moreover, the propulsion system 50 includes a second propulsion assembly 54, which is an electric fan assembly. The electric generator 56 is electrically connected to the electric fan assembly for powering the electric fan assembly.

Notably, however, for the embodiment of FIG. 4, the electric fan assembly includes a plurality of electric fans 200. More specifically, the electric fan assembly of FIG. 4 includes a first electric fan 200A mounted to the port side wing 20 of the aircraft 10 at a location laterally outward of the fuselage 12 relative to the turbofan engine 100. The electric fan assembly of FIG. 4 further includes a second electric fan 200B mounted to the starboard side wing 22 and a third electric fan 200C also mounted to the starboard side wing 22. The second and third electric fans 200B, 200C are spaced along the lateral direction L of the aircraft 10. Accordingly, for the exemplary embodiment of FIG. 4, the electric fan assembly includes a plurality of electric fans 200, the plurality of electric fans 200 including at least two electric fans 200, and more specifically for the embodiment depicted, at least three electric fans 200. Notably, however, in other exemplary embodiments, the electric fan assembly may include any other suitable number of electric fans 200. For example, in other exemplary embodiments the electric fan assembly may include two electric fans 200, four electric fans 200, or any other suitable number of electric fans 200. Additionally, the plurality of electric fans 200 may be arranged in any other suitable manner, and attached to the aircraft 10 at any suitable location (including tail mounted configurations).

Further, for the embodiment depicted, the plurality of electric fans 200 may be powered at least in part by a power source. The power source includes a plurality of batteries 55 in electrical communication with the electric power bus 58 depicted in FIG. 4, and further in electrical communication with the electric generator 56 (not shown) of the first propulsor 52. The electric generator 56 may be provided to power/charge the batteries, to provide power directly to one or more of the electric fans 200 through the electric power bus 58, or both. In addition, the power source includes a plurality of controllers 62.

Figure 5:
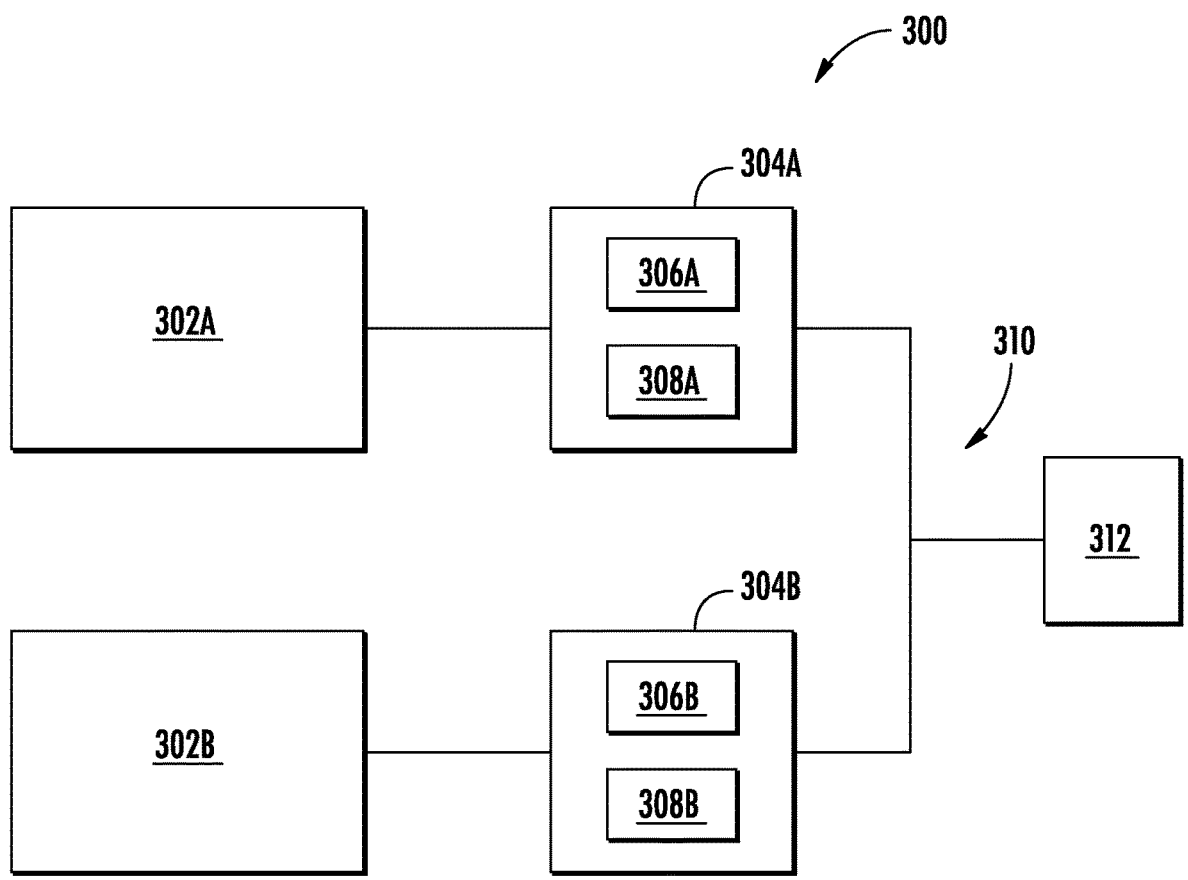
FIG. 5 is a close-up view of a power source in accordance with an exemplary embodiment of the present disclosure.

Referring now to FIG. 5, a close-up view of a power source 300 in accordance with an exemplary embodiment of the present disclosure is provided. For example, in certain exemplary embodiments, the power source 300 of FIG. 5 may be configured in a similar manner as the power source 300 described above with reference to FIG. 4.

As shown, the power source 300 includes a battery 302 and a power conditioner 304, the power conditioner 304 including a converter 306 in electrical communication with the battery 302 and a controller 308 in operable communication with the converter 306. More specifically, for the embodiment shown, the power source 300 includes a plurality of batteries 302 and a corresponding plurality of power conditioners 304. More specifically, still, for the embodiment shown, the battery 302 is a first battery 302A and the power conditioner 304 is a first power conditioner 304A (such that the converter 306 is a first converter 306A and the controller 308 is a first controller 308A). Further for the embodiment depicted, the power source 300 further includes a second battery 302B and a second power conditioner 304B having a second converter 306B in electrical communication with the second battery 302B and a second controller 308B in operable communication with the second converter 306B.

For the embodiment shown, the first battery 302A and first power conditioner 304A are in electrical communication with an electric power bus 310 (similar to bus 58), and similarly, the second battery 302B and second power conditioner 304B are also in electrical communication with the electric power bus 310. In such a manner, the first battery 302A and second battery 302B may provide electrical power through the electric power bus 310 to a load 312, may receive electric power from the electric power bus 310 to charge the first battery 302A and the second battery 302B, or both.

In certain exemplary embodiments, the load 312 may be an electric or hybrid-electric propulsor (such as in the embodiments described above with reference to FIGS. 1 through 4), may be an aircraft system load, etc.

It will be appreciated that although a single load 312 is depicted in FIG. 5, in other example embodiments the power source 300 may provide power to any suitable number and type of loads. For example, the power source 300 may be configured to provide electrical power to the second propulsor assembly 54 depicted in FIG. 1, the plurality of electric fans 200 depicted in FIG. 4, etc.

In such a manner, it will be appreciated that the batteries 302 may be relatively powerful batteries 302, capable of providing a relatively large amount of electrical power to the load 312 (or loads 312). For example, in certain exemplary embodiments, each of the batteries 302 may define a maximum power output of at least 200 volts (V). Alternatively, in other embodiments, each of the batteries 302 may define a maximum power output of at least 250 V, of at least 300 V, of at least 400 V, of at least 500 V, and up to, e.g., 5000 V. Each of the plurality of batteries 302 may define substantially the same maximum power output.

Notably, however, each of the plurality of batteries 302, and more specifically, the first battery 302A and the second battery 302B, may define a different state of charge (i.e., a charge level for the battery). For example, the first battery 302A may define a first state of charge different than a second state of charge defined by the second battery 302B. When two batteries defining different states of charge are electrically connected to the load 312, the battery 302 with the lower state of charge may pull a higher current and may therefore drain more quickly than the battery 302 with the higher state of charge. Generally, it is desirable to maintain batteries 302 having substantially equal states of charge, to ensure desired system performance is available. Such is particularly the case in a propulsion system, such as in an aeronautical propulsion system.

Figure 6:
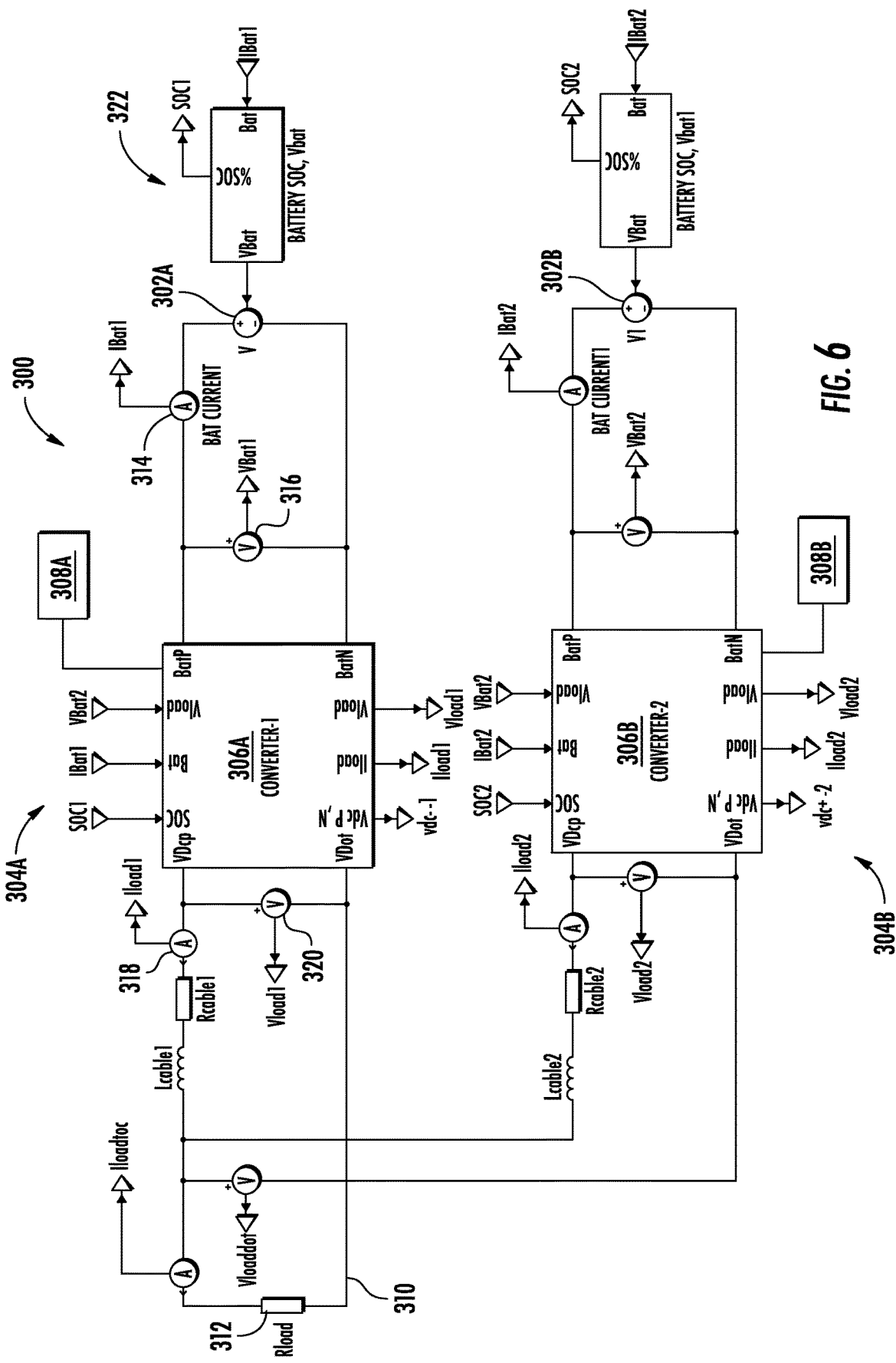
FIG. 6 is a schematic diagram of a power source in accordance with an exemplary embodiment of the present disclosure.

Referring now to FIG. 6, a schematic diagram is depicted of a power source 300 in accordance with an exemplary embodiment of the present disclosure having one or more features for normalizing the states of charge across a plurality of batteries 302. In certain embodiments, the power source 300 depicted in FIG. 6 may be similar to the exemplary power source 300 described above with reference to, e.g., FIG. 5. For example, the power source 300 of FIG. 6 generally includes a first battery 302A and a second battery 302B, as well as a first power conditioner 304A and a second power conditioner 304B. For the embodiment shown, the first battery 302A and the second battery 302B are in electrical communication with a load 312 in a parallel electrical communication arrangement.

The first power conditioner 304A generally includes a first converter 306A in electrical communication with the first battery 302A and a first controller 308A in operable communication with the first converter 306A. Similarly, the second power conditioner 304B generally includes a second converter 306B in electrical communication with the second battery 302B and a second controller 308B operable communication with the second converter 306B. The first controller 308A is configured to instruct the first converter 306A to modify a power provided from the first battery 302A to the load 312 in a manner such that a state of charge of the first battery 302A is normalized with a state of charge of the second battery 302B. Similarly, the second controller 308B is configured to instruct the second converter 306B to modify a power provided from the second battery 302B to the load 312 in a manner such that the state of charge of the second battery 302B is normalized with the state of charge of the first battery 302A.

For example, as will be explained in more detail below, the controllers 308A, 308B are each configured such that under at least certain circumstances, more power is drawn from the battery(ies) 302 having higher states of charge than battery(ies) 302 having lower states of charge. This concept is referred to as dynamic droop control herein. Droop control systems may control a power output of a battery to provide a more consistent power output across a range of the battery's state of charge by applying a droop resistance in a droop control circuit. The present disclosure further dynamically controls the droop resistance under certain circumstances (e.g., less than high power requirement situations) to normalize the states of charge across a plurality of batteries.

Notably, in the embodiment shown, the first controller 308A and second controller 308B are communicatively isolated from one another. In such a manner, it will be appreciated that the normalization of the states of charge of the first battery 302A in the second battery 302B is accomplished without communicating between first and second controllers 308A, 308B and/or first and second converters 306A, 306B, and instead is based on locally sensed quantities. As used herein, the term "locally sensed" with respect to a particular controller 308 and/or converter 306 refers to quantities/parameters sensed in the circuitry including the respective battery, upstream of where the circuitry meets the electric power bus 310.

Operation of the exemplary system will now be described more specifically with reference to the first battery 302A and first power conditioner 304A. Referring still to FIG. 6, it will be appreciated that the power source 300 includes various sensors for sensing currents and voltages throughout the respective circuits. For example, the power source 300 includes a first battery current sensor 314 for sensing a current flow from the first battery 302A, a first battery voltage sensor 316 for sensing a voltage of the power provided from the first battery 302A, a first load current sensor 318 for sensing a current flow to the load 312, and a first load voltage sensor 320 for sensing a voltage of the power provided to the first load 312. Further, the power source 300 includes a first state of charge circuit 322 for determining a first state of charge of the first battery 302A based on data sensed from the first battery current sensor 314 and the first battery voltage sensor 316. It will be appreciated that although not labeled, for the exemplary power source 300 depicted, the power source 300 includes similar sensors for the second battery 302B circuit.

Figure 7:
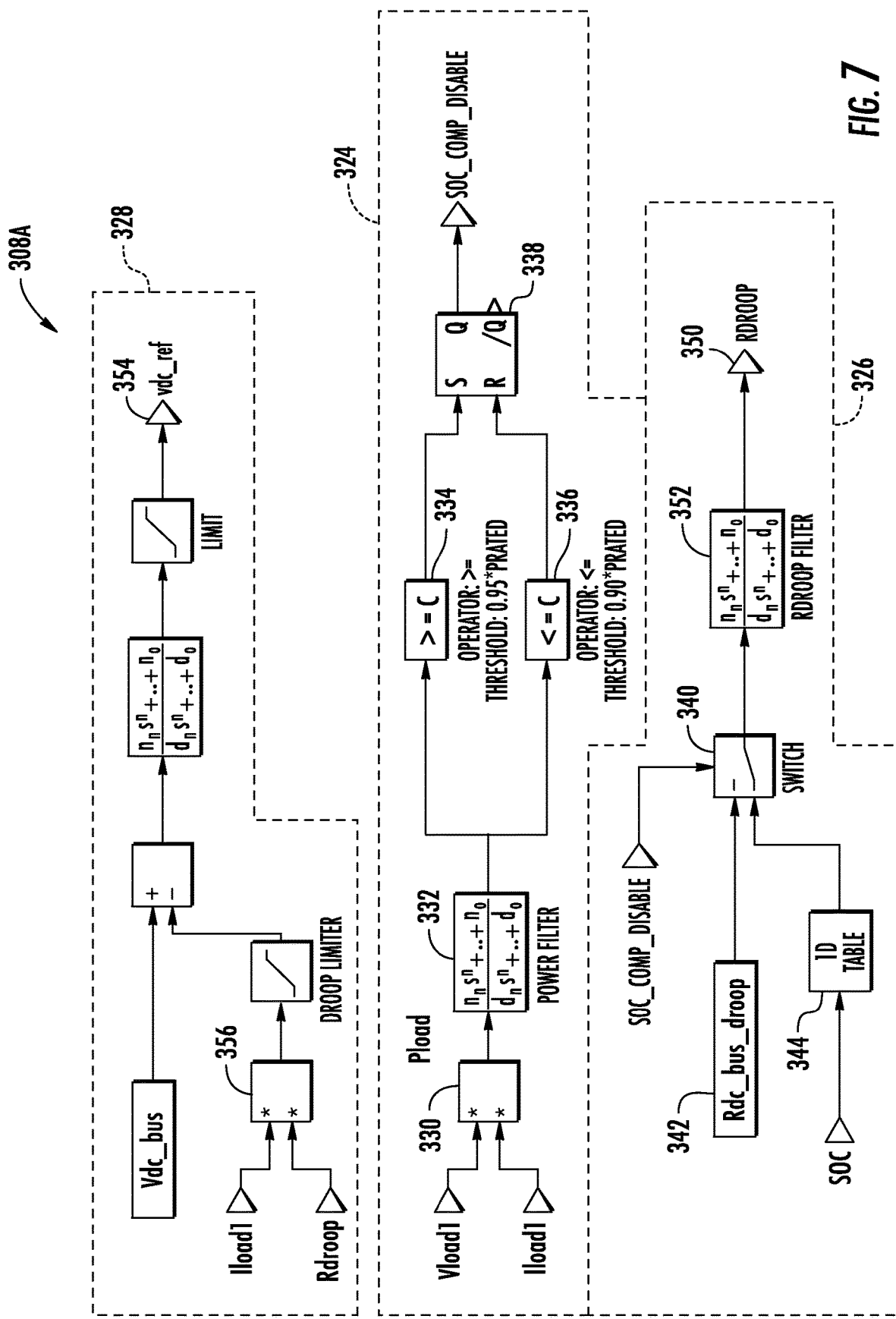
FIG. 7 is a close-up schematic view of a first controller of the power source of FIG. 6.

Referring still to FIG. 6 and now also to FIG. 7, a close-up schematic view of the first controller 308A is provided. As will be appreciated from the discussion herein the first power conditioner 304 is configured to receive various locally sensed quantities from, e.g., the first battery sensors 314, 316, 318, 320 and sub-circuits 322 and control the power output from the first battery 302A to the load 312 to normalize the state of charge of the first battery 302A with other batteries 302 of the power source 300 (i.e., with battery 302B for the embodiment shown).

Specifically, it will be appreciated that for the embodiment shown, the controller 308 generally includes a compensation toggle circuit 324, a dynamic droop control circuit 326, and a voltage regulator droop circuit 328.

Referring particular to the compensation toggle circuit 324, the compensation toggle circuit 324 is configured to receive data indicative of the power output from the first battery 302A to the load 312, and more specifically, is configured to receive data indicative of a voltage of the power provided to the load 312 and a current of the power provided to the load 312, each from the first battery 302A. This information may be provided from the first load current sensor 318 and the first load voltage sensor 320. The information is received and used to determine data indicative of a power provided from the first battery 302A to the load 312 at block 330.

The exemplary compensation toggle circuit 324 passes the power output data from block 330 through a power filter 332, and then determines if the power output is above a predetermined upper threshold at block 334 or below a predetermined lower threshold at block 336. For the embodiment shown, the predetermined upper threshold is 95% of a maximum power output of the first battery 302A and the predetermined lower threshold is 90% of the maximum power output of the first battery 302A. However, in other embodiments, these upper and lower thresholds they be set to any other suitable value. Further, for the embodiment depicted the upper and lower thresholds define a gap therebetween to ensure the output doesn't toggle back and forth when the power output is right on the border of one of these thresholds.

The compensation toggle circuit 324 is in configured to determine a compensation toggle value based on the power output of the battery 302 at block 338 and provide the compensation toggle value as an output. More specifically, if the power output is above the predetermined upper threshold, the compensation toggle circuit 324 provides a first compensation toggle value and if the power output is below the predetermined lower threshold, the compensation toggle circuit 324 provides a second compensation toggle value. The first and second compensation toggle values may be "TRUE" and "FALSE" values, "1" and "0" values, or the like.

The compensation toggle value output from block 338 is then provided to the dynamic droop control circuit 326. The dynamic droop control circuit 326 is configured to receive the compensation toggle value at a switch block 340 and switch an output droop value of the dynamic control circuit from an upper output droop measurement to a lower output droop measurement based at least in part on the compensation toggle value. For the embodiment shown, the upper output droop measurement is based on a baseline droop resistance set at block 342, and the lower output droop measurement is based on the state of charge of the first battery 302A, calculated at block 344 using the state of charge of the first battery 302A. More specifically, for the embodiment shown, the lower output droop measurement is based on a lookup table at block 344, and the value returned from the lookup table being based on the state of charge of the battery 302. It will be appreciated, however, that in certain exemplary aspects, the lower output droop measurement may additionally be based on other parameters, such as available power margin of the converter (e.g., first converter 306A, described below).

Figure 8:
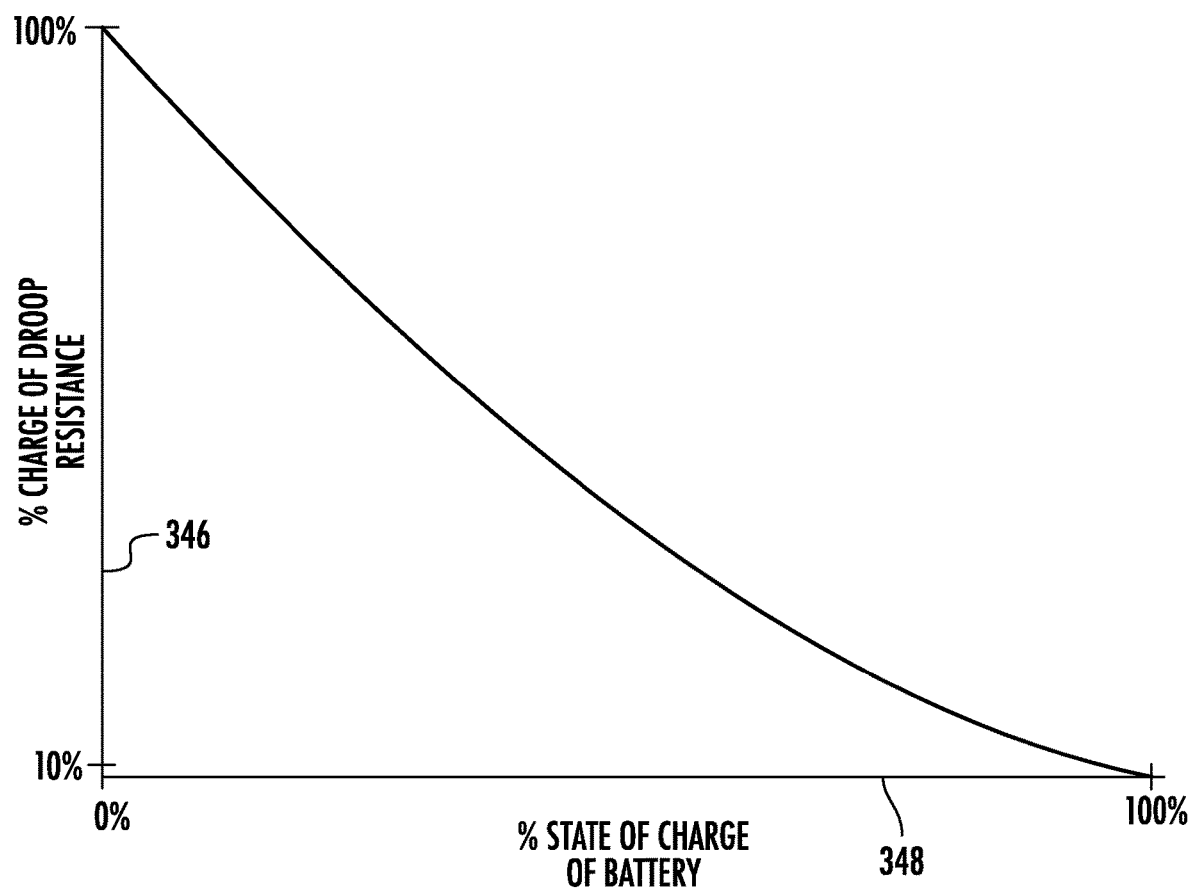
FIG. 8 is a lookup table in accordance with an exemplary embodiment of the present disclosure.

More particularly, referring briefly to FIG. 8, a sample lookup table of the present disclosure as may be used at block 344 is provided. As will be appreciated, the lookup table includes example changes in a droop resistance along its Y-axis 346 based on the state of charge of the first battery 302A along its X-axis 348. As will be appreciated, the lower output droop measurement returned from the lookup table (the % change in droop resistance measurement for the embodiment shown) is non-linear over a range of the state of charge of the first battery 302A.

Referring now back to FIG. 7, it will be appreciated that a droop resistance is output at 350 from the dynamic droop control circuit 326. Based on the position of the switch at block 340, the droop resistance is either the upper output droop measurement (calculated based on the output of block 342, passed through a filter 352, or the lower output droop measurement (calculated based on the output of block 344, passed through the filter 352. It will be appreciated that as used herein the terms "upper" and "lower", as used with respect to the upper and lower output droop measurements, are meant only to distinguish the two measurements from one another and not to imply any relative value or the like.

As is further depicted, the droop resistance is output at 350 and provided to the voltage regulator droop circuit 328 which utilizes the output droop value to determine a voltage reference at 354 to be provided from the first battery 302A to the load 312. More specifically, the voltage regulator droop circuit 328 receives the current being provided from the first battery 302A to load 312 and the output droop value at block 356, which again is the droop resistance, and sets the reference voltage to be provided by the first battery 302A to the load 312 through a series of additional blocks, filters, etc.

Referring again also to FIG. 6, the reference voltage output at 354 from the voltage regulator droop circuit 328 is provided to the first converter 306A, and the first converter 306A is configured to receive power from the first battery 302A and modify the power provided from the first battery 302A consistent with the output of the voltage regulator droop circuit 328 to provide a desired power to the load 312.

Notably, for the embodiment shown, the first converter 306A is a DC to DC converter 306 (i.e., a direct current to direct current converter 306).

It will be appreciated that in other exemplary embodiments, the voltage regulator droop circuit 328 may have other suitable configurations and similarly, the first converter 306A may have any suitable configuration for providing the stated functionality.

In such a manner, it will be appreciated that the first controller 308A is generally configured to determine how much power is being provided to the load 312. If it is a relatively high amount of power (e.g., above the upper threshold), the dynamic droop control circuit 326 provides the upper output droop measurement, which is based on the baseline droop resistance at block 342, passed through the filter 352. By contrast, if the power provided to the load 312 is relatively small (e.g., below the lower threshold, the dynamic droop control circuit 326 provides the lower output droop measurement, which is based on the lookup table at block 344 and first state of charge, passed through the droop filter 352. In such a manner, if a relatively high amount of power is needed, the controller 308 does not provide dynamic droop control and instead prioritizes providing the desired power output. By contrast, if a relatively low amount of power is needed, the controller 308 does provide a dynamic droop control that is non-linear over the span of states of charge of the first battery 302A, to allow the states of charge of the plurality of batteries 302 to normalize. More specifically, with such a configuration, the dynamic droop control pulls more power from the batteries 302 having a higher state of charge than those having a lower state of charge.

Referring still to FIG. 6, it will further be appreciated that the exemplary power source 300 depicted schematically includes a similar configuration for the second battery circuitry (connecting the second battery 302B to the electric power bus 310 and load 312). More specifically, as noted above, the power source 300 further includes the second power conditioner 304B, the second power conditioner 304B including a second converter 306B in electrical communication with the second battery 302B and the second controller 308B in operable communication with the second converter 306B. The second controller 308B may be configured in substantially the same manner as the first controller 308A, as described in more detail above with reference to FIG. 7. For example, the second controller 308B may include a second compensation toggle circuit (not shown, similar to 324) configured to provide a second compensation toggle value based on a power output of the second battery 302B, and a second dynamic droop control circuit (not shown, similar to 326) configured to receive the second compensation toggle value and switch an output droop value of the second dynamic control circuit from an upper output droop measurement to a lower output droop measurement. The lower output droop measurement of the output droop value of the dynamic droop control circuit may be based on a second state of charge of the second battery 302B. For example, similar to the configuration described above with reference to, e.g., FIGS. 7 and 8, the lower output droop measurement of the output droop value of the dynamic droop control circuit may be based on a lookup table based on the second state of charge of the second battery 302B. The lookup table for the second dynamic control loop may be the same lookup table as is used for the first dynamic control loop, or alternatively, may be a different lookup table.

Further, the second controller 308B may further include a second voltage regulator droop circuit 328 which utilizes the output droop value of the second dynamic droop control circuit 326.

In such a manner, it will be appreciated that two or more of the batteries 302 (or each of the batteries 302) may employ selective dynamic droop controls to more effectively normalize the states of charge of the batteries 302 without requiring operability communications between the respective controllers 308, converters, 306, or the like.

Figure 9:
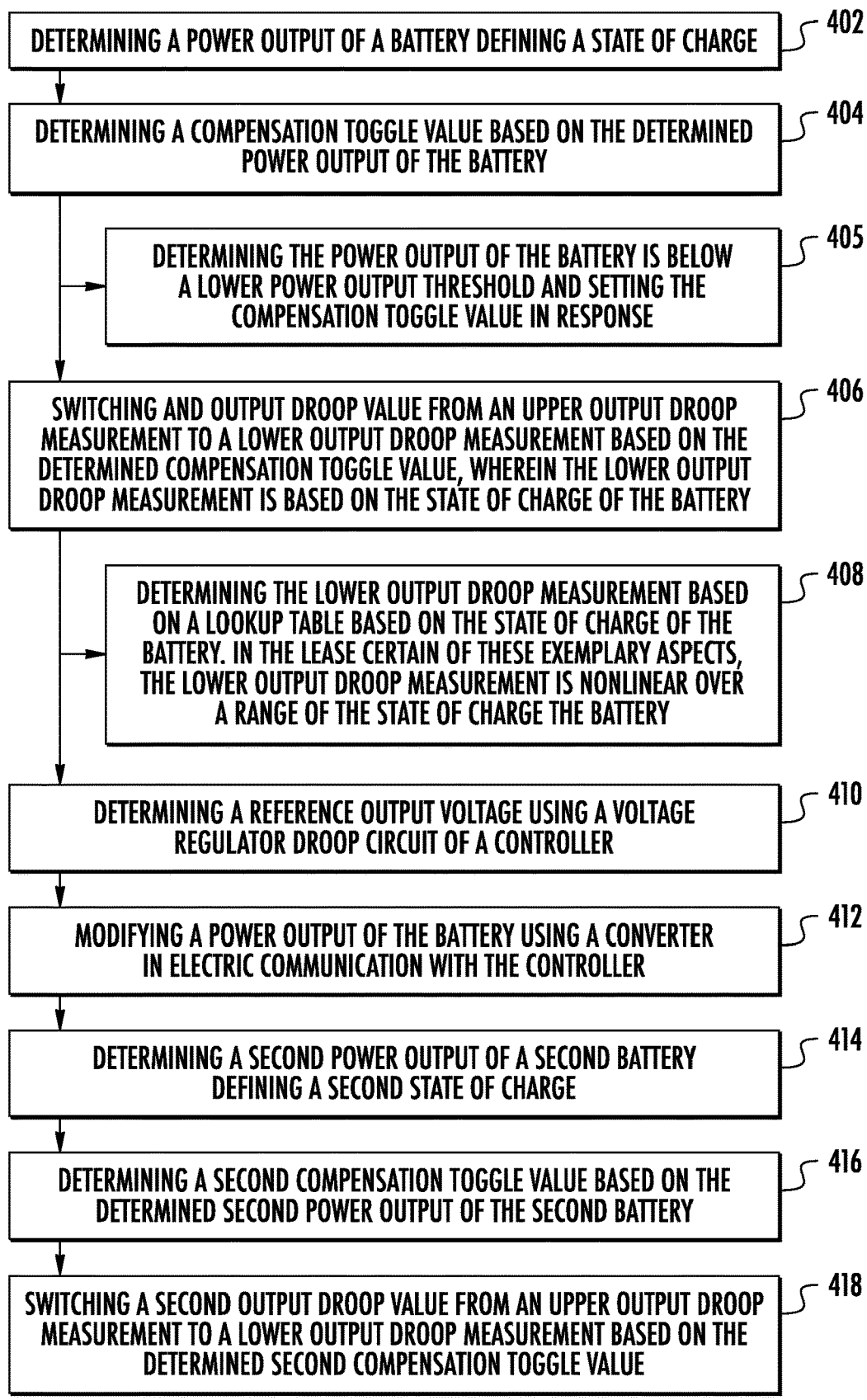
FIG. 9 is a flow diagram of a method of operating an electric power source.

Referring now to FIG. 9, a flow diagram of a method 400 of operating an electric power source is provided. The method 400 may be utilized with one or more of the exemplary power sources described above with reference to FIGS. 1 through 8. Alternatively, in other exemplary embodiments, the exemplary method 400 of FIG. 9 may be utilized with any other suitable power source.

The method 400 includes at (402) determining a power output of a battery defining a state of charge, and at (404) determining a compensation toggle value based on the determined power output of the battery at (402). In the least certain exemplary aspects, determining the compensation toggle value based on the determined power output of the battery at (404) includes at (405) determining the power output of the battery is below a lower power output threshold and setting the compensation toggle value in response.

Further, the method 400 includes at (406) switching and output droop value from an upper output droop measurement to a lower output droop measurement based on the determined compensation toggle value, wherein the lower output droop measurement is based on the state of charge of the battery.

As with the embodiments described above, the upper output droop measurement may be based on a baseline droop resistance.

Referring still to FIG. 9, for the exemplary aspect depicted, switching the output droop value from the upper output droop measurement to the lower output droop measurement at (406) includes at (408) determining the lower output droop measurement based on a lookup table based on the state of charge of the battery. In the lease certain of these exemplary aspects, the lower output droop measurement is nonlinear over a range of the state of charge the battery.

The method 400 further includes at (410) determining a reference output voltage using a voltage regulator droop circuit of a controller, the voltage regulator droop circuit utilizing the output droop value of the dynamic droop control circuit. The method 400 additional includes at (412) modifying a power output of the battery using a converter in electric communication with the controller, and more specifically, modifying a power output of the battery using the converter in electrical communication with the controller based on the determined reference output voltage at (410).

Moreover, it will be appreciated that in the least certain exemplary aspects, the method 400 described herein may be utilized with a plurality of batteries. For example, in certain example embodiments, the battery described above may be a first battery, the state of charge may be a first state of charge and the method 400 may further include: at (414) determining a second power output of a second battery defining a second state of charge; at (416) determining a second compensation toggle value based on the determined second power output of the second battery at (414); and at (418) switching a second output droop value from an upper output droop measurement to a lower output droop measurement based on the determined second compensation toggle value. With such an exemplary aspect, the lower output droop measurement may be based on the second state of charge of the battery (e.g., utilizing a lookup table). Notably, the steps (414), (416), and (418) may occur in parallel with the earlier method steps.

Further aspects of the present disclosure are set forth in the following clauses:

An electric power source comprising: a battery defining a state of charge; a converter in electrical communication with the battery; and a controller in operable communication with the converter, the controller comprising a compensation toggle circuit configured to provide a compensation toggle value based on a power output of the battery; a dynamic droop control circuit configured to receive the compensation toggle value and switch an output droop value of the dynamic droop control circuit from an upper output droop measurement to a lower output droop measurement, wherein the lower output droop measurement is based on the state of charge of the battery.

The electric power source of one or more of these clauses, wherein the upper output droop measurement is based on a baseline droop resistance.

The electric power source of one or more of these clauses, wherein the lower output droop measurement is based on a lookup table based on the state of charge of the battery.

The electric power source of one or more of these clauses, wherein the lower output droop measurement is non-linear over a range of the state of charge of the battery.

The electric power source of one or more of these clauses, the controller further comprises a voltage regulator droop circuit utilizing the output droop value of the dynamic droop control circuit.

The electric power source of one or more of these clauses, wherein the battery is a first battery, wherein the state of charge is a first state of charge, wherein the converter is a first converter, wherein the controller is a first controller, and wherein the electric power source further comprises a second battery defining a second state of charge; a second converter in electrical communication with the second battery; a second controller in operable communication with the second converter, the second controller comprising a second compensation toggle circuit configured to provide a second compensation toggle value based on a power output of the second battery; a second dynamic droop control circuit configured to receive the second compensation toggle value and switch an output droop value of the second dynamic droop control circuit from an upper output droop measurement to a lower output droop measurement, wherein the lower output droop measurement is based on the second state of charge of the second battery.

The electric power source of one or more of these clauses, wherein the lower output droop measurement of the output droop value of the second dynamic droop control circuit is based on a lookup table that is based on the second state of charge of the second battery.

The electric power source of one or more of these clauses, wherein the first controller and second controller are communicatively isolated from one another.

The electric power source of one or more of these clauses, wherein the first controller comprises a first voltage regulator droop circuit utilizing the output droop value of the first dynamic droop control circuit, and wherein the second controller comprises a second voltage regulator droop circuit utilizing the output droop value of the second dynamic droop control circuit.

The electric power source of one or more of these clauses, wherein the first battery and the second battery are in electrical communication with a common load.

The electric power source of one or more of these clauses, wherein the compensation toggle circuit is configured to provide a compensation toggle value equal to a first output when the power output is above an upper threshold and a second output when the power output is below a lower threshold.

The electric power source of one or more of these clauses, wherein the dynamic droop control circuit is configured switch the output droop value of the dynamic droop control circuit from the upper output droop measurement to the lower output droop measurement when the compensation toggle value is equal to the second output.

The electric power source of one or more of these clauses, wherein the electric power source is for a propulsion system.

The electric power source of one or more of these clauses, wherein the electric power source is for an aeronautical propulsion system.

The electric power source of one or more of these clauses, wherein the first battery defines a maximum power output of at least 250 volts.

The electric power source of one or more of these clauses, wherein the first battery defines a maximum power output of at least 500 volts and up to 5000 volts.

The electric power source of one or more of these clauses, wherein the converter is a DC to DC converter.

A method of operating an electric power source comprising: determining a power output of a battery defining a state of charge; determining a compensation toggle value based on the determined power output of the battery; switching an output droop value from an upper output droop measurement to a lower output droop measurement based on the determined compensation toggle value, wherein the lower output droop measurement is based on the state of charge of the battery.

The method of one or more of these clauses, wherein the upper output droop measurement is based on a baseline droop resistance.

The method of one or more of these clauses, wherein switching the output droop value from the upper output droop measurement to the lower output droop measurement comprises determining the lower output droop measurement based on a lookup table based on the state of charge of the battery.

The method of one or more of these clauses, wherein the lower output droop measurement is non-linear over a range of the state of charge of the battery.

The method of one or more of these clauses, further comprises determining a reference output voltage using a voltage regulator droop circuit of a controller, the voltage regulator droop circuit utilizing the output droop value of the dynamic droop control circuit; and modifying a power output of the battery using a converter in electric communication with the controller.

The method of one or more of these clauses, wherein the battery is a first battery, wherein the state of charge is a first state of charge, and wherein the method further comprises determining a second power output of a second battery defining a second state of charge; determining a second compensation toggle value based on the determined second power output of the second battery; switching a second output droop value from an upper output droop measurement to a lower output droop measurement based on the determined second compensation toggle value, wherein the lower output droop measurement is based on the second state of charge of the battery.

The method of one or more of these clauses, wherein determining the compensation toggle value based on the determined power output of the battery comprises determining the power output of the battery is below a lower threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric power source comprising:
   a battery defining a state of charge;
   a converter in electrical communication with the battery; and
   a controller in operable communication with the converter, the controller comprising
     a compensation toggle circuit configured to provide a compensation toggle value based on data indicating a determined power output of the battery; and
     a dynamic droop control circuit configured to receive the compensation toggle value and switch an output droop value of the dynamic droop control circuit from an upper output droop measurement to a lower output droop measurement, wherein the lower output droop measurement is based on the state of charge of the battery.

2. The electric power source of claim 1, wherein the upper output droop measurement is based on a baseline droop resistance.

3. The electric power source of claim 1, wherein the lower output droop measurement is based on a lookup table based on the state of charge of the battery.

4. The electric power source of claim 3, wherein the lower output droop measurement is non-linear over a range of the state of charge of the battery.

5. The electric power source of claim 1, the controller further comprises a voltage regulator droop circuit utilizing the output droop value of the dynamic droop control circuit.

6. The electric power source of claim 1, wherein the battery is a first battery, wherein the state of charge is a first state of charge, wherein the converter is a first converter, wherein the controller is a first controller, and wherein the electric power source further comprises
   a second battery defining a second state of charge;
   a second converter in electrical communication with the second battery;
   a second controller in operable communication with the second converter, the second controller comprising
     a second compensation toggle circuit configured to provide a second compensation toggle value based on a power output of the second battery;
     a second dynamic droop control circuit configured to receive the second compensation toggle value and switch an output droop value of the second dynamic droop control circuit from an upper output droop measurement to a lower output droop measurement, wherein the lower output droop measurement is based on the second state of charge of the second battery.

7. The electric power source of claim 6, wherein the lower output droop measurement of the output droop value of the second dynamic droop control circuit is based on a lookup table that is based on the second state of charge of the second battery.

8. The electric power source of claim 6, wherein the first controller and second controller are communicatively isolated from one another.

9. The electric power source of claim 6, wherein the first controller comprises a first voltage regulator droop circuit utilizing the output droop value of the first dynamic droop control circuit, and wherein the second controller comprises a second voltage regulator droop circuit utilizing the output droop value of the second dynamic droop control circuit.

10. The electric power source of claim 6, wherein the first battery and the second battery are in electrical communication with a common load.

11. The electric power source of claim 1, wherein the compensation toggle circuit is configured to provide the compensation toggle value equal to a first output when the power output is above an upper threshold and a second output when the power output is below a lower threshold.

12. The electric power source of claim 11, wherein the dynamic droop control circuit is configured switch the output droop value of the dynamic droop control circuit from the upper output droop measurement to the lower output droop measurement when the compensation toggle value is equal to the second output.

13. The electric power source of claim 1, wherein the electric power source is for a propulsion system, and wherein the converter is a DC to DC converter.

14. The electric power source of claim 1, wherein the first battery defines a maximum power output of at least 250 volts.

15. A method of operating an electric power source comprising:
   determining a power output of a battery defining a state of charge;
   determining a compensation toggle value based on the determined power output of the battery;
   switching an output droop value from an upper output droop measurement to a lower output droop measurement based on the determined compensation toggle value, wherein the lower output droop measurement is based on the state of charge of the battery.

16. The method of claim 15, wherein the upper output droop measurement is based on a baseline droop resistance.

17. The method of claim 15, wherein switching the output droop value from the upper output droop measurement to the lower output droop measurement comprises determining the lower output droop measurement based on a lookup table based on the state of charge of the battery.

18. The method of claim 15, wherein the method further comprises determining a reference output voltage using a voltage regulator droop circuit of a controller, the voltage regulator droop circuit utilizing the output droop value of the dynamic droop control circuit; and modifying a power output of the battery using a converter in electric communication with the controller.

19. The method of claim 15, wherein the battery is a first battery, wherein the state of charge is a first state of charge, and wherein the method further comprises determining a second power output of a second battery defining a second state of charge;

determining a second compensation toggle value based on the determined second power output of the second battery;

switching a second output droop value from an upper output droop measurement to a lower output droop measurement based on the determined second compensation toggle value, wherein the lower output droop measurement is based on the second state of charge of the battery.

20. The method of claim 15, wherein determining the compensation toggle value based on the determined power output of the battery comprises determining the power output of the battery is below a lower threshold.

* * * * *